United States Patent
Wu et al.

(10) Patent No.: US 9,509,044 B2
(45) Date of Patent: Nov. 29, 2016

(54) HEADSET, CIRCUIT STRUCTURE OF MOBILE APPARATUS, AND MOBILE APPARATUS

(75) Inventors: Wei-Yang Wu, Taoyuan (TW);
Kuan-Jung Hung, Taoyuan (TW);
Yueh-Hsiang Chen, Taoyuan (TW);
Tzu-Hsun Tung, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 563 days.

(21) Appl. No.: 13/491,025

(22) Filed: Jun. 7, 2012

(65) Prior Publication Data

US 2013/0222702 A1    Aug. 29, 2013

Related U.S. Application Data

(60) Provisional application No. 61/604,551, filed on Feb. 29, 2012.

(51) Int. Cl.
| | |
|---|---|
| H04R 1/10 | (2006.01) |
| H01Q 1/46 | (2006.01) |
| H04M 1/725 | (2006.01) |
| H04R 25/00 | (2006.01) |

(52) U.S. Cl.
CPC ........... *H01Q 1/46* (2013.01); *H04M 1/72527* (2013.01); *H04R 1/1033* (2013.01); *H04R 2201/107* (2013.01); *H04R 2499/11* (2013.01)

(58) Field of Classification Search
CPC .............. H01Q 1/00; H04R 2201/107; H04R 2499/11; H04R 1/1033; H04M 1/72527
USPC ............ 381/74, 370, 384; 343/720; 455/557
See application file for complete search history.

(56) References Cited

U.S. PATENT DOCUMENTS

| | | |
|---|---|---|
| 7,064,720 B2 | 6/2006 | Yoshino |
| 7,236,137 B2 | 6/2007 | Yoshino et al. |
| 7,340,285 B2 | 3/2008 | Yoshino |

(Continued)

FOREIGN PATENT DOCUMENTS

| | | |
|---|---|---|
| CN | 101055936 A | 10/2007 |
| CN | 101674434 A | 3/2010 |

(Continued)

OTHER PUBLICATIONS

Japanese Office Action dated on Dec. 4, 2014.

(Continued)

*Primary Examiner* — Vivian Chin
*Assistant Examiner* — Ammar Hamid
(74) *Attorney, Agent, or Firm* — Rabin & Berdo, P.C.

(57) ABSTRACT

A headset, a circuit structure of a mobile apparatus, and a mobile apparatus are provided. The headset includes at least one earphone, a microphone, an audio plug, and a headset cable. The audio plug includes a connector having a plurality of contacts. The microphone and the at least one earphone is coupled to the corresponding contacts of the audio plug through the headset cable. The headset cable includes a ground line, a microphone line, at least one audio line, and an antenna for receiving a television broadcasting signal. The antenna is coupled to one of the contacts coupled to the ground line, the microphone line, and the at least one audio line. The one of the contacts to which the antenna is coupled further serves as a radio frequency contact to provide the television broadcasting signal and an audio broadcasting signal.

14 Claims, 7 Drawing Sheets

(56) References Cited

U.S. PATENT DOCUMENTS

| | | | |
|---|---|---|---|
| 7,373,169 B2 | 5/2008 | Yoshino | |
| 7,671,813 B2 | 3/2010 | Yoshino et al. | |
| 7,701,398 B2 | 4/2010 | Korner | |
| 7,840,242 B2 | 11/2010 | Yoshino | |
| 7,907,095 B2 | 3/2011 | Kimura et al. | |
| 8,140,114 B2 | 3/2012 | Komori et al. | |
| 2006/0166719 A1* | 7/2006 | Arad | H01Q 1/242 455/575.2 |
| 2007/0127741 A1 | 6/2007 | Kimura et al. | |
| 2008/0084356 A1 | 4/2008 | Korner | |
| 2008/0122711 A1 | 5/2008 | Kimura et al. | |
| 2008/0254831 A1 | 10/2008 | Mukai et al. | |
| 2009/0315643 A1* | 12/2009 | Yamakawa | H03H 7/0115 333/174 |
| 2010/0053005 A1* | 3/2010 | Mukai | H01Q 1/46 343/720 |
| 2011/0221973 A1 | 9/2011 | Hung | |
| 2011/0235844 A1* | 9/2011 | Yoshino | H01Q 1/24 381/384 |
| 2012/0188462 A1* | 7/2012 | Lynn | H01Q 1/24 348/725 |
| 2013/0178149 A1* | 7/2013 | Mankaruse | H01Q 1/242 455/3.06 |

FOREIGN PATENT DOCUMENTS

| | | |
|---|---|---|
| CN | 102163765 A | 8/2011 |
| CN | 102201632 A | 9/2011 |
| EP | 2112839 A2 | 10/2009 |
| JP | 59-089004 A | 5/1984 |
| JP | 09-199237 A | 7/1997 |
| JP | 09-312894 A | 12/1997 |
| JP | 2003-163529 A | 6/2003 |
| JP | 2004-274356 A | 9/2004 |
| JP | 2005-064742 A2 | 3/2005 |
| JP | 2006-135845 A | 5/2006 |
| JP | 2006-287721 A | 10/2006 |
| JP | 3933148 B2 | 3/2007 |
| JP | 3938118 B2 | 4/2007 |
| JP | 2007-142987 A | 6/2007 |
| JP | 2007-188723 A | 7/2007 |
| JP | 4003671 B2 | 8/2007 |
| JP | 4023500 B2 | 10/2007 |
| JP | 4026648 B2 | 10/2007 |
| JP | 2007-288232 A | 11/2007 |
| JP | 2008-035427 A | 2/2008 |
| JP | 4123262 B2 | 5/2008 |
| JP | 4123800 B2 | 7/2008 |
| JP | 4186765 B2 | 9/2008 |
| JP | 2008-236113 A2 | 10/2008 |
| JP | 2008-263373 A2 | 10/2008 |
| JP | 2008-278398 A2 | 11/2008 |
| JP | 2008-301125 A | 12/2008 |
| JP | 2008-311825 A2 | 12/2008 |
| JP | 2009-188783 A2 | 8/2009 |
| JP | 4363865 B2 | 8/2009 |
| JP | 2010-016577 A | 1/2010 |
| JP | 4419806 B2 | 2/2010 |
| JP | 2010-062611 A | 3/2010 |
| JP | 2010-062612 A2 | 3/2010 |
| JP | 2010-068168 A | 3/2010 |
| JP | 4569449 B2 | 8/2010 |
| JP | 4715603 B2 | 4/2011 |
| JP | 4743148 B2 | 5/2011 |
| JP | 4743240 B2 | 5/2011 |
| JP | 4748099 B2 | 5/2011 |
| JP | 2011-135615 A | 7/2011 |
| JP | 2011-172125 A | 9/2011 |
| JP | 2011-205595 A | 10/2011 |
| JP | 4904895 B2 | 1/2012 |
| JP | 4924126 B2 | 2/2012 |
| TW | I267229 B | 11/2006 |

OTHER PUBLICATIONS

Taiwanese Office Action dated Jul. 25, 2016.

* cited by examiner

HEADSET, CIRCUIT STRUCTURE OF MOBILE APPARATUS, AND MOBILE APPARATUS

This application claims the benefit of U.S. provisional application Ser. No. 61/604,551, filed Feb. 29, 2012, the subject matter of which is incorporated herein by reference.

BACKGROUND

1. Technical Field

The disclosed embodiments relate in general to a headset cable, a headset, a circuit structure of a mobile device, and a mobile apparatus.

2. Description of the Related Art

The electronic devices with television broadcast receiving functionality are conventionally equipped with telescopic antennas, which need to be stretch out when the television is being watched. For a mobile device, e.g., a mobile phone or a multimedia player, such an approach may be convenient for assembly and manufacture of the mobile device. However, the appearance design as well as the circuit of the mobile device would be subject to the telescopic antenna.

SUMMARY

The disclosure is directed to a headset cable, a headset, a circuit structure of a mobile device, and a mobile apparatus.

According to one embodiment, a headset cable is provided. The headset cable includes an antenna for television signal reception and a plurality of audio lines.

According to another embodiment, a headset is provided. The headset includes a headset cable and an audio plug. The headset cable includes an antenna for television signal reception and a plurality of audio lines. In one embodiment, the headset includes at least one earphone, a microphone, an audio plug, and a headset cable. The audio plug includes a connector having a plurality of contacts. The microphone and the at least one earphone is coupled to the corresponding contacts of the audio plug through the headset cable. The headset cable includes a ground line, a microphone line, at least one audio line, and an antenna for receiving a television broadcasting signal. The antenna for receiving a television broadcasting signal is coupled to one of the contacts coupled to the ground line, the microphone line, and the at least one audio line. The one of the contacts to which the antenna for receiving the television broadcasting signal is coupled further serves as a radio frequency contact to provide the television broadcasting signal and an audio broadcasting signal.

According to another embodiment, a circuit structure of a mobile device is provided. The circuit structure includes a broadcast receiving unit and a plurality of signal paths extended from an audio jack. In one embodiment, the circuit structure of a mobile apparatus includes an audio jack, a plurality of inductive devices, an audio processing unit, a radio tuner, and a digital television tuner. The audio jack has a ground terminal and a plurality of signal terminals for a microphone line and at least one audio line, wherein one of the signal terminals further serves as a radio frequency terminal for a television broadcasting signal and an audio broadcasting signal. The audio processing unit is coupled to the terminals of the audio jack through the inductive devices. The radio tuner is coupled to the radio frequency terminal to receive the audio broadcasting signal. The digital television tuner is coupled to the radio frequency terminal to receive the television broadcasting signal.

According to another embodiment, a mobile apparatus is provided. The mobile apparatus includes a circuit structure and an audio jack. In one embodiment, a mobile apparatus includes an audio jack, a plurality of inductive devices, an audio processing unit, a radio tuner, a digital television tuner, a display unit, and a processing unit. The audio jack has a ground terminal and a plurality of signal terminals for a microphone line and at least one audio line, wherein one of the signal terminals further serves as a radio frequency terminal for a television broadcasting signal and an audio broadcasting signal. The audio processing unit is coupled to the terminals of the audio jack through the inductive devices. The radio tuner is coupled to the radio frequency terminal to receive the audio broadcasting signal. The digital television tuner is coupled to the radio frequency terminal to receive the television broadcasting signal. The processing unit, in response to a request for displaying television, enables the digital television tuner to receive the television broadcasting signal so as to display television on the display unit.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 1:
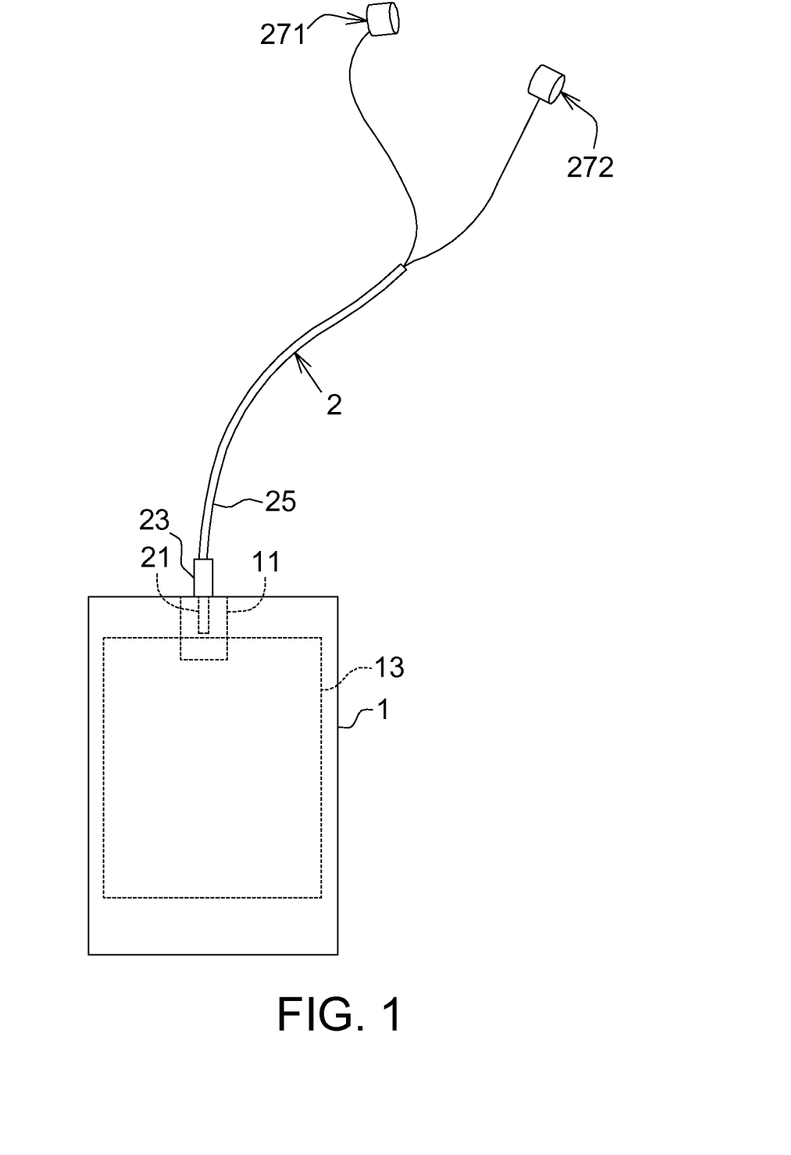
FIG. 1 illustrates a mobile apparatus with a headset plugged in according to an embodiment.

FIG. 1 illustrates a mobile apparatus with a headset plugged in according to an embodiment. In FIG. 1, a mobile apparatus 1 can be embodied as any mobile computing devices, e.g., a mobile phone, a smart phone, a tablet, a multimedia player, a game machine, and so on. The mobile apparatus 1 has the functionality of receiving a radio (e.g., FM radio) and television broadcasting signal (e.g., digital TV broadcasting, such as 1-Seg, DVB-H or any mobile TV standard) and reproduces the sound and/or video. A headset 2 in FIG. 1 serves as an antenna device for receiving the radio and television broadcasting signal as well as serving as a normal headset. The headset 2 includes a headset cable 25, an audio plug 23, and earphones 271 and 272. As will be illustrated in the following embodiments, the headset 2, e.g., the headset cable 25 includes an antenna structure for receiving a television broadcasting signal, e.g., for digital television, such as 1-Seg, or Digital Video Broadcasting (DVH) (e.g., DVH-H) standard. In addition, the headset 2, e.g., the headset cable 25, also serves as an antenna for receiving a radio broadcasting signal, e.g., for FM radio.

The mobile apparatus 1 includes a circuit structure 13 for radio and television broadcasting signal reception with a broadcast receiving unit. In the examples as a mobile phone or smart mobile phone, the mobile apparatus 1 may also include a plurality devices or components for intended implementation, such as a processing unit (e.g., a single core, multi-core processor, or system-on-chip), a display unit (e.g., LCD, OLED, so on or the display device with touch sensing functionality), a storage unit, and a communication unit (e.g., support for one or more of communication standards for 2G, 3G, 3.5G, 4G, WiFi, GPS, and so on). In some examples, the processing unit may enable or control the broadcast receiving unit so that the mobile apparatus 1 reproduces the received broadcast signal (e.g., radio or TV).

As shown in FIG. 1, the circuit structure 13 is electrically coupled to a male connector 21 of the audio plug 23 of the headset 2 through an audio jack 11 (i.e., female connector) of the mobile apparatus 1. Such a connection makes the mobile apparatus 1 have the headset 2 as a television antenna and a radio antenna as well. Accordingly, the headset 2 leads to the flexibility of the appearance design and circuit design of the mobile apparatus 1. In addition, the convenience of use of the mobile apparatus 1 for watching television with the headset 2 serving as the antenna can enhance better user experience.

In some embodiments, the headset 2 may include at least one earphone, a microphone, an audio plug including a connector having a plurality of contacts; and a headset cable, wherein the microphone and the at least one earphone is coupled to the corresponding contacts of the audio plug through the headset cable. The headset cable includes a ground line, a microphone line and at least one audio line, and an antenna for receiving a television broadcasting signal. The antenna for receiving the television broadcasting signal is coupled to one of the contacts coupled to the ground line, the microphone line, and the at least one audio line. The one of the contacts to which the antenna for receiving the television broadcasting signal is coupled further serves as a radio frequency contact to provide the television broadcasting signal (e.g., digital television broadcasting) and an audio broadcasting signal (e.g., FM radio broadcasting or digital audio broadcasting).

Various embodiments for the structure of the headset 2 and the circuit structure 13 of the mobile apparatus 1 are provided as follows.

Embodiment One

Figure 2:
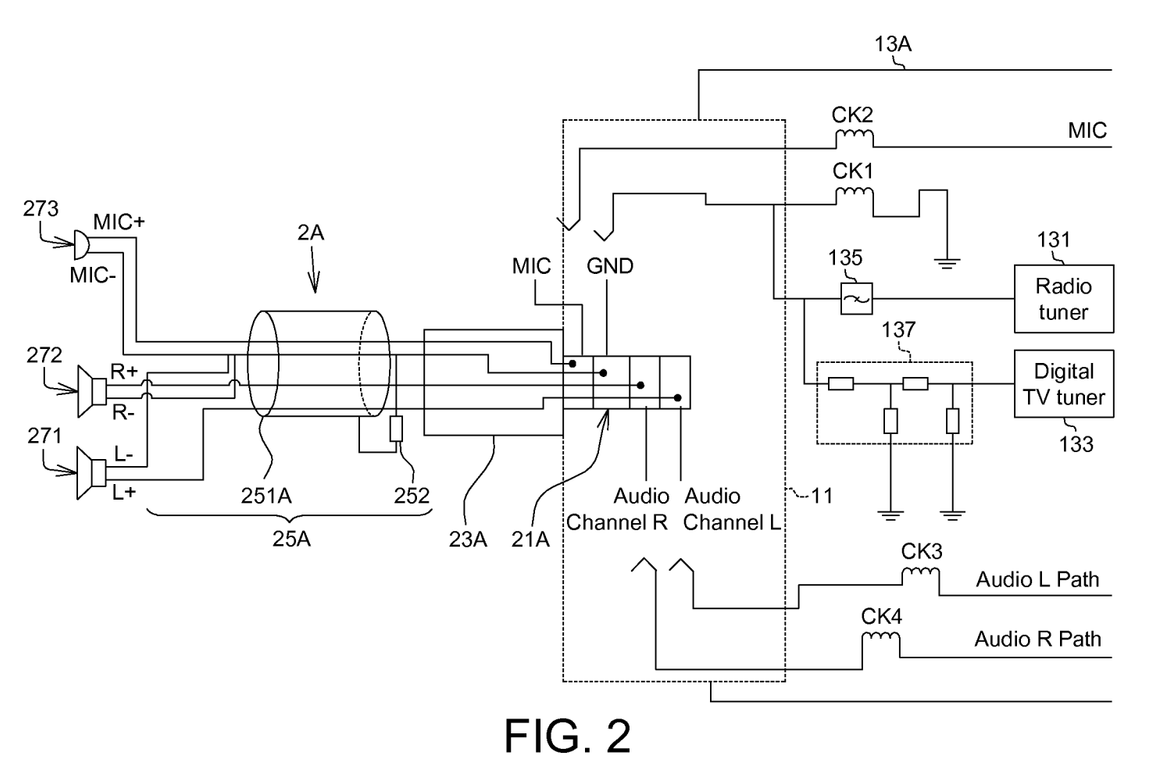
FIG. 2 shows a block diagram illustrating that a headset is plugged in an audio plug of a mobile apparatus according to one embodiment.

FIG. 2 shows a block diagram illustrating that a headset is plugged in an audio jack of a mobile apparatus according to one embodiment. In FIG. 2, a headset 2A includes a headset cable 25A, an audio plug 23A, earphones 271 and 272. For various implementations, a microphone 273 (or two for right and left channels) can also be included in the headset 2A optionally.

The audio plug 23A has a male connector 21A including a plurality of contacts. Through the conductors of the audio jack 11, several signal paths corresponding to the contacts of the male connector 21A may be extended from the audio jack 11, e.g., MIC (i.e., microphone), GND (i.e., ground), audio L (i.e., audio left channel), and audio R (or, audio right channel) paths. The signal paths are connected to some devices or components for corresponding functionalities. For example, the GND path is connected to ground. The MIC, audio L, and audio R paths are connected to, for example, an audio processing unit or multimedia chipset of the mobile apparatus 1.

Further, at least one of the signal paths can be additionally employed for radio and television broadcasting signal reception with a broadcast receiving unit. In FIG. 2, the GND path is employed and is coupled to a broadcast receiving unit including a radio tuner 131 (e.g., FM tuner) and a digital television tuner 133 (e.g., 1-Seg tuner).

With respect to the circuit structure 13A in FIG. 2, the headset cable 25A of the headset 2A correspondingly includes a conductor 251A as a digital television antenna (e.g., for 1-Seg), wherein the conductor 251A is coupled to the contact for GND of the male connector 21A through a DC (direct current) blocking device, such as at least one circuit device 252, e.g., a capacitor. In addition, the headset cable 25A also includes a GND line as a radio antenna (e.g., for FM radio). In FIG. 2, the conductor 251A also surrounds portions of the GND line, audio lines and MIC lines. The conductor 251A has a length at or not less than ¼ wavelength of the frequency for the television broadcasting signaling, e.g., λ/4 of 470 MHz~870 MHz within ultra-high frequency band (UHF) for 1-Seg. For example, λ/4 for UHF for 1-Seg, the conductor 251A has a length of about 150 mm.

In this embodiment, the circuit structure 13A includes the radio tuner 131 and the digital television tuner 133 both coupled to the GND path. For obtaining the FM radio signal, the radio tuner 131 is connected to the GND path through a filter 135 (e.g., a bandpass filter). The digital television tuner 133 is connected to the GND path through a matching circuit 137, e.g., an LC circuit.

With respect to the configuration of the headset 2A, the circuit structure 13A includes a plurality of inductive components, e.g., chokes, such as chokes CK1, CK2, CK3, and CK4. For RF signals (FM or 1-Seg), a choke CK1 is connected to ground and isolates (or, blocks) RF signals. Hence, the GND path is open when it is viewed from the broadcasting receiving unit. But for audio signal (DC), the choke CK1 is regarded as short-circuited and choke CK1 has a small resistance (50~100 mOhm). Thus, the GND is not pure ground, which may induce a voltage drop. It might lead to cross-talk issue on L/R channels.

In other implementations according to the embodiment as shown in FIG. 2, the conductor 251A is coupled to the contact of the male connector 21A (e.g., the contact for MIC, left or right audio channel or both audio channels) other than the contact for GND. In addition, one of the MIC line and the audio lines, rather than the GND line, can be employed as the antenna for audio broadcasting signal reception. Following this, the radio tuner 131 and the digital television tuner 133 in the circuit structure 13A both are coupled to the signal path (e.g., the MIC path or audio path) other than the GND path. In this manner, the GND path in the circuit structure 13A does not need to connect to the choke CK1 and the GND can thus result in a pure ground potential. The above cross-talk issue on L/R channels can be reduced or solved.

Embodiment Two

Figure 3A:
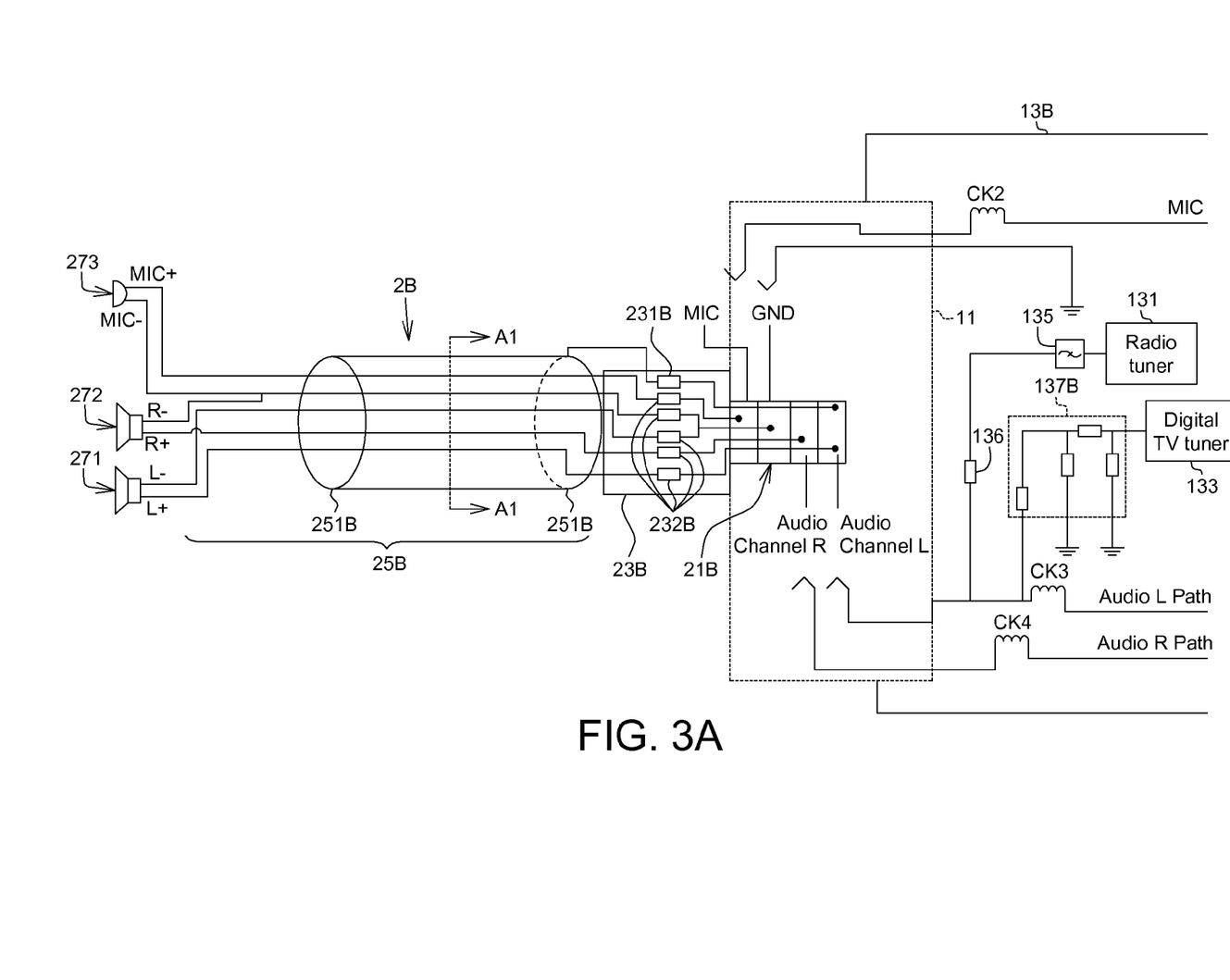
FIG. 3A shows a block diagram illustrating that another headset is plugged in an audio plug of a mobile apparatus according to one embodiment.

FIG. 3A shows a block diagram illustrating that another headset is plugged in an audio plug of a mobile apparatus according to one embodiment. In FIG. 3A, a headset 2B includes a headset cable 25B and an audio plug 23B. As compared with the headset 2A of FIG. 2, the headset 2B of FIG. 3A has a different configuration in which a conductor 251B coupled to the contact for L-CH line of the male connector 21B of the audio plug 23B is employed as a television antenna (e.g., for 1-Seg) and a radio antenna (e.g., for FM). That is, the contact for L-CH line serves as a radio frequency contact. The conductor 251B is coupled to the contact for L-CH line through a direct current blocking device 231B, such as a capacitor. In addition, each of the other channel lines of the headset cable 25B for the microphone 273 and earphones 271 and 272 is coupled to the contact for the corresponding channel line through a corresponding choke 232B. Further, in one embodiment, the ground connection for the earphones 271 and 272 are in common mode configuration; that is, the two lines denoted by "L-" and "R-" have their respective signal paths and are coupled to the contact for the GND through their corresponding chokes 232B, thus reducing or avoiding the common impedance. In one example, the choke 232B and the DC blocking device are disposed within the audio plug 23B.

Figure 3B:
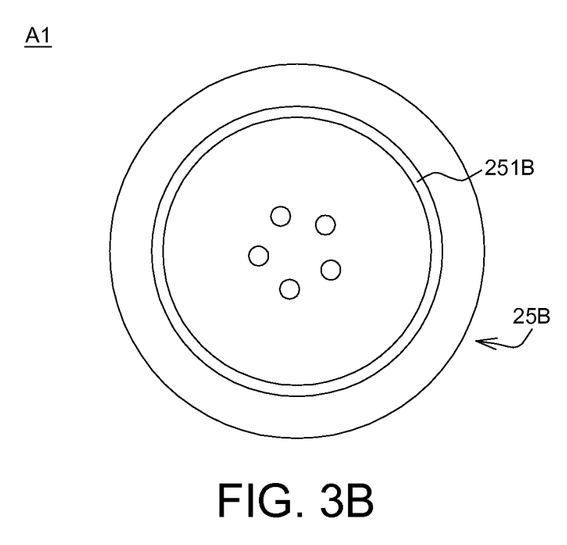
FIG. 3B shows an example of a cross-sectional view of the headset cable 25B of the headset 2B taken along with line A1-A1 in FIG. 3A.

In FIG. 3A, the conductor 251B also surrounds portions of the GND line, audio lines and MIC lines. Referring to FIG. 3B, a cross-sectional view of the headset cable 25B of the headset 2B taken along with line A1-A1 in FIG. 3A illustrates that within the width of the television antenna, the GND line, audio lines and MIC lines of the headset cable 25B are surrounded by the conductor 251B, disposed within the headset cable 25B. The conductor 251B may have a length equal to or greater than, i.e., not less than, one wavelength $\lambda$ at a frequency within UHF band for the television broadcasting reception. For example, the conductor 251B has a length of greater than one wavelength $\lambda$ for UHF for 1-Seg, about 750 mm. In this way, the conductor 251B having a length enough for serving as both an antenna for receiving the television broadcasting signal and an antenna for receiving the audio broadcasting signal. In addition, the GND line, audio lines and MIC lines may longer than the width of the television antenna, i.e., the conductor 251B.

In this structure of the headset 2B, the conductor 251B, e.g., a 1-seg/CMMB antenna, is an external conductor surrounding the other lines of the headset cable 25B, and is coupled to the L-CH line. With respect to the configuration of the headset 2B, the circuit structure 13B in FIG. 3A has the broadcast receiving unit coupled to the L-CH signal path corresponding. Thus, when the headset 2B is plugged in the audio jack 11, the conductor 251B is coupled to the digital television receiving tuner 133, e.g., 1-Seg/CMMB tuner. In addition, the L-CH signal path of the circuit structure 13B is also coupled to the radio tuner 131. Thus, there is unnecessary to use a RF choke on the GND path for blocking RF. In this way, as shown in FIG. 3A, the GND signal path will not be equipped with a choke. As compared with the configuration of using the GND signal path, a better RF performance and a better audio performance can be obtained at the same time.

The embodiment two can also be implemented with the employment of the contact for the audio right channel (R-CH) line or the microphone line of the headset to serve as a radio frequency contact to provide the television broadcasting signal and an audio broadcasting signal, in place of employment and the connection of the contact for the L-CH line, both for the headset 2B and the circuit structure 13B.

Embodiment Three

Figure 4:
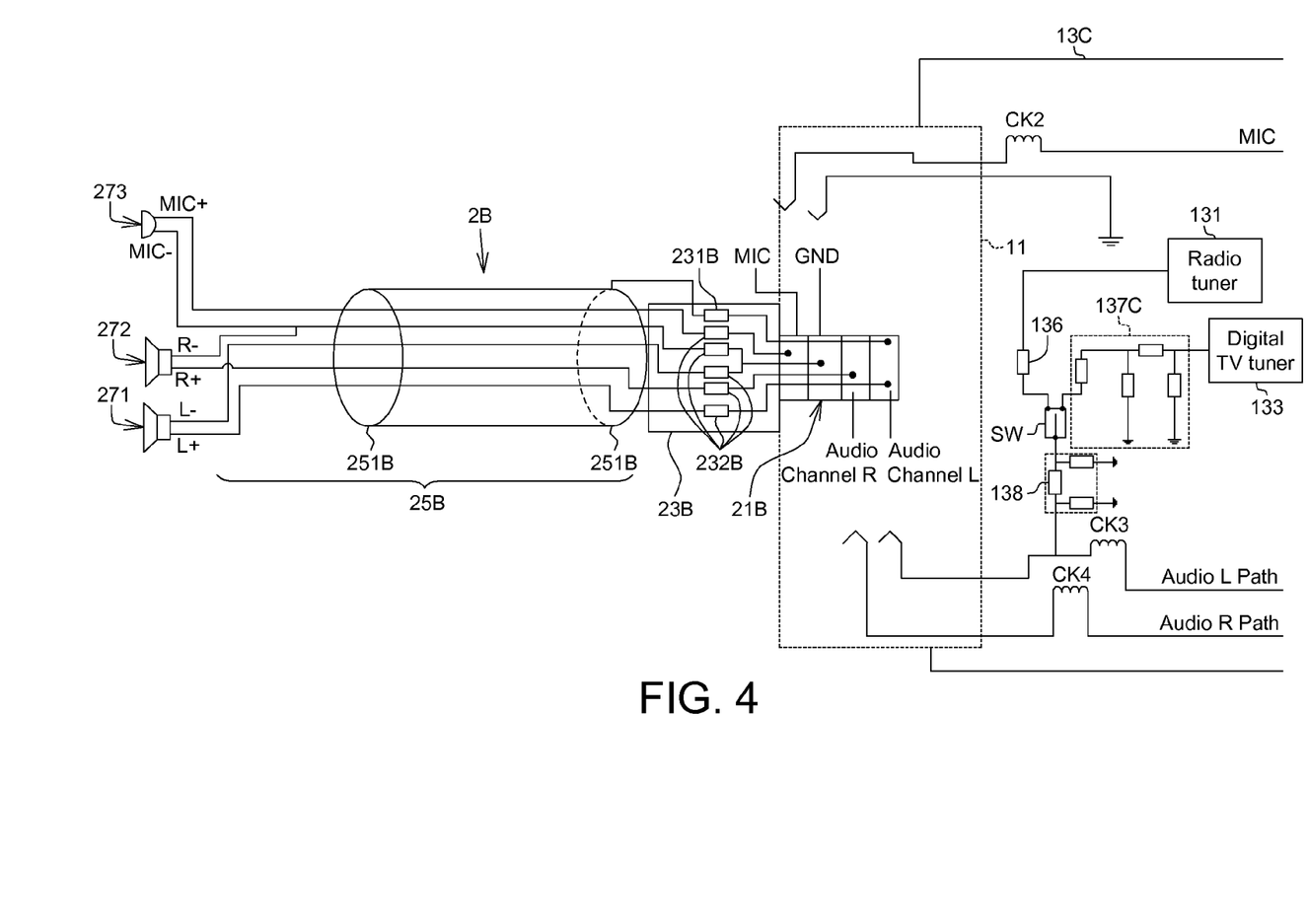
FIG. 4 shows a block diagram illustrating that the headset as shown in FIG. 3A is plugged in an audio plug of a mobile apparatus with another circuit structure according to one embodiment.

FIG. 4 shows a block diagram illustrating that the headset as shown in FIG. 3A is plugged in an audio plug of a mobile apparatus with another circuit structure according to one embodiment. As compared with FIG. 3A, the headset 2B is the same but the circuit structure 13C has a different circuit configuration. In the circuit structure 13C, the radio tuner 131 and the digital television tuner 133 are coupled to the L-CH signal path through a switch device (e.g., an RF switch, such as a SPDT switch). In the path between the tuner and the L-CH signal path, matching circuits, as indicated by dashed-rectangle are required.

Embodiment Four

Figure 5A:
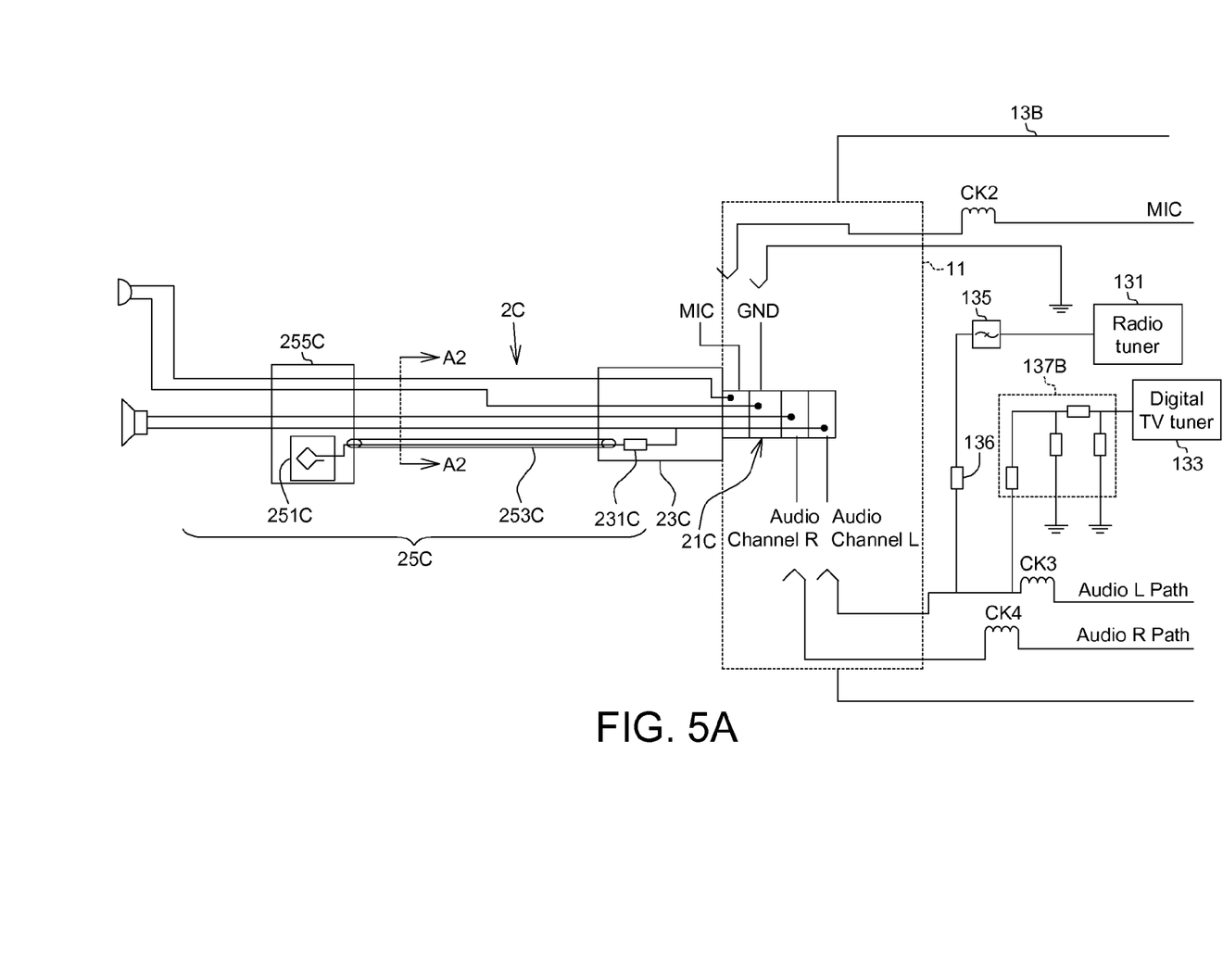
FIG. 5A shows a block diagram illustrating that another embodiment of a headset is plugged in the audio plug of the mobile apparatus shown in FIG. 3A.
Figure 5B:
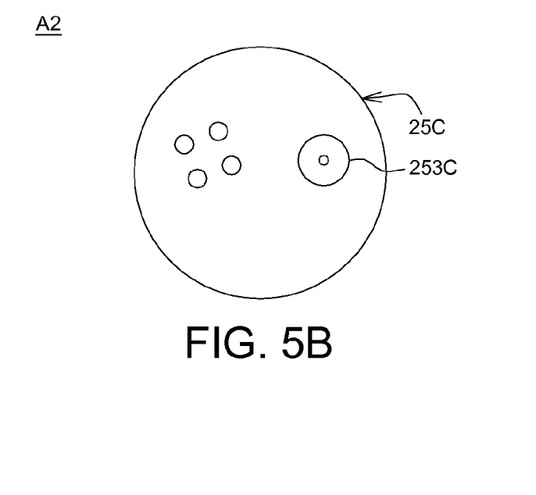
FIG. 5B shows an example of a cross-sectional view of the headset cable 25C of the headset 2C taken along line A2-A2 in FIG. 5A.

FIG. 5A shows a block diagram illustrating that another embodiment of a headset is plugged in the audio plug of the mobile apparatus shown in FIG. 3A. As compared with FIG. 3A, the circuit structure 13C is the same but a headset 2C has a different antenna configuration. In FIG. 5A, the headset 2C includes a headset cable 25C and an audio plug 23C. The L-CH line (or the microphone line or R-CH line) of the headset cable 25C is used as a radio antenna. The headset cable 25C further includes an antenna 251C, e.g., implemented by an external meander antenna disposed on a PCB or Flex PCB, for digital television broadcast reception and a transmission line, such as a coaxial cable 253C, coupled to the digital television antenna 251C. Referring to FIG. 5B, a cross-sectional view of the headset cable 25C of the headset 2C taken along with line A2-A2 in FIG. 5A illustrates that the coaxial cable 253C disposed within the headset cable 25C is separate from the GND line, the audio lines, and MIC lines of the headset cable 25C. In addition, the GND line, audio lines and MIC lines may longer than the length of the coaxial cable 253C.

For example, an electrical device 231C, e.g., a capacitor, is coupled between the coaxial cable 253C and the L-CH line for matching, wherein the electrical device 231C may be disposed in the audio plug 23C as shown in FIG. 5A or outside the audio plug 23C. In this structure, the antenna 251C has enough space and has keep out area far away with GND, and the coaxial cable 253C provides very low loss and good shielding for the television signal (e.g., 1-Seg) from the antenna 251C to the L-CH line. Thus, there is unnecessary to use a RF choke on the GND path for blocking RF. In this way, as shown in FIG. 3A, the GND signal path will not be equipped with a choke. As compared with the configuration of using the GND signal path, a better RF performance and a better audio performance can be obtained at the same time.

In other embodiments, the antenna 251C of FIG. 5A may be covered by a plastic box 255C, and connected by the coaxial cable 253C to the L-CH line.

Other Embodiments

In other embodiments, the embodiment two, three, and four in FIGS. 3-5 respectively can also be implemented with the employment of the contact for the audio right channel (R-CH) line or the microphone line of the headset to serve as a radio frequency contact to provide the television broadcasting signal and an audio broadcasting signal, in place of employment of and the connection to the L-CH line, both for the headset and the circuit structure.

In further embodiments, the embodiment one and four in FIGS. 2 and 5A respectively can also be implemented with the employment of both the L-CH and R-CH lines for radio antenna and the connection of the television antenna to one of the L-CH and the R-CH lines, both for the headset and the circuit structure, wherein the radio tuner 131 are coupled to both the L-CH and the R-CH signal paths of the circuit structure 13A or 13B.

Figure 6:
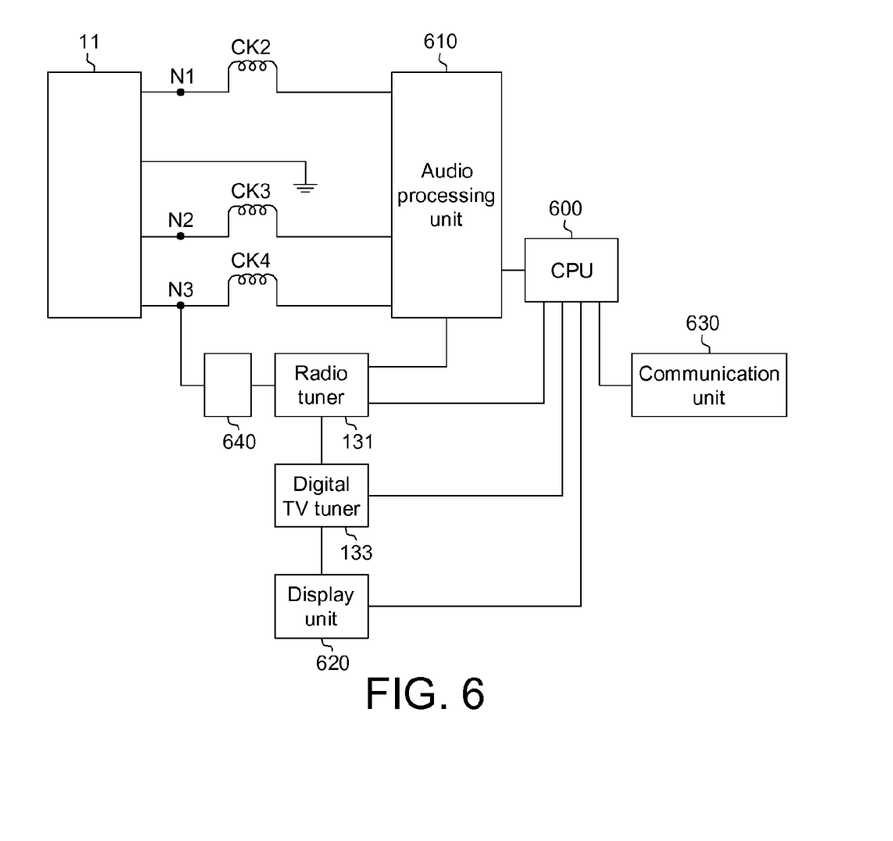
FIG. 6 shows a mobile apparatus according to one embodiment.

FIG. 6 shows a mobile apparatus according to one embodiment. The mobile apparatus includes a circuit structure. The circuit structure includes an audio jack 11 having a ground terminal and a plurality of signal terminals, e.g., node N1, N2, and N3, for a microphone line and at least one audio line. One of the signal terminals (e.g., node N3 for an audio channel) further serves as a radio frequency terminal for a television broadcasting signal and an audio broadcasting signal. The circuit structure also includes a plurality of inductive devices, such as chokes CK2, CK3, and CK4. In one example, the circuit structure also includes an audio processing unit 610, a radio tuner 131, and a digital television tuner 133. The audio processing unit 610 is coupled to the terminals of the audio jack 11 through the inductive devices, such as chokes CK2, CK3, and CK4. The radio tuner 131 is coupled to the radio frequency terminal (e.g., node N3) to receive the audio broadcasting signal. The digital television tuner 133 is coupled to the radio frequency terminal (e.g., node N3) to receive the television broadcasting signal.

In other embodiments, the circuit structure also includes an analog circuit 640, wherein the digital television tuner and the radio tuner are coupled to the radio frequency terminal through the analog circuit 640. In one example, the analog circuit 640 includes a filter (e.g., filter 135 in FIG. 2) for enabling the radio tuner 131 to receive the audio broadcasting signal. In one example, the analog circuit 640 further includes an impedance matching circuit for the digital television tuner 133 (e.g., 137, 137B, 137C in FIG. 2, 3A, 4 or 5A). In another example, the analog circuit 640 comprises a radio frequency switch (e.g., SW in FIG. 4) coupled to the radio frequency terminal, the digital television tuner 133 and the radio tuner 131. In other example, the analog circuit 640 can include other circuit device, for example, a DC blocking device 136 in FIG. 3A, 4 or 5A, such as a capacitor.

According to examples of the circuit structure as exemplified above, a mobile apparatus can be realized. In some embodiments, the mobile apparatus further includes a processing unit (e.g., a single-core or multi-core processor or a system on chip) 600 and a display unit 620 (e.g., a liquid crystal display, an organic light emitting display, and so on). The processing unit 600, in response to a request for displaying television, enables the digital television tuner 133, e.g., by way of sending an instruction or logic signal, to receive the television broadcasting signal so as to display television on the display unit 620. The request for displaying television, for example, may be generated from a user interface displayed by the display unit 620, or a physical or virtual switch or button of the mobile apparatus. In another embodiment of the mobile apparatus with the analog circuit 640 including a radio frequency switch coupled to the radio frequency terminal, the digital television tuner and the radio tuner, the processing unit 600, in response to the request for displaying television, further enables the radio frequency switch to output the television broadcasting signal to the digital television tuner 133 so as to display television on the display unit 620.

For the mobile apparatus as illustrated in FIG. 6, when a headset, for example, as exemplified in the above embodiments, is plugged in the audio jack 11 of the mobile apparatus, the radio frequency contact of the headset (e.g., the contact for the right channel line in the headset) is coupled to the radio frequency terminal (e.g., node N3 for right channel path) of the mobile apparatus so as to provide the television broadcasting signal and the audio broadcasting signal to the circuit structure of the mobile apparatus. That is, the circuit structure of the mobile apparatus enables the headset to be an antenna for television broadcasting signal reception and an antenna for audio broadcasting signal reception. In the manner, the circuit design of the mobile apparatus can be simplified since the television antenna needs not to be embedded into the main body of the mobile apparatus.

Further, the mobile apparatus can include other components or unit for requirements of the functionality of the mobile apparatus. In some embodiments, the mobile apparatus can be realized as a smart mobile phone or a tablet and a communication unit 630, e.g., supporting some wireless or network communication, such as 2G, 3G, 4G, Wi-Fi, or GPS.

It is noted that FIG. 1 is for the sake of illustration only. According to the above embodiments, different types of headsets may be implemented: single earphone or double earphone. The headset may also with or without a microphone. For those headsets with microphones, the microphone may be externally or internally equipped. The headsets may be over-the-head headsets, backwear-headsets, over-the-ear headsets, or convertible headsets. In other examples, the headset according to the embodiment may also include a headset controller on the headset, which may be equipped with one or more buttons or other control device and/or the microphone. For example, a control device may be included in the headset for enabling or disabling the television display or channel setting.

It will be apparent to those skilled in the art that various modifications and variations can be made to the disclosed embodiments. It is intended that the specification and examples be considered as exemplary only. A true scope of the disclosure is indicated by the following claims and their equivalents.

What is claimed is:

1. A headset, comprising:
   at least one earphone;
   a microphone;
   an audio plug including a connector having a plurality of contacts; and
   a headset cable, wherein the microphone and the at least one earphone is coupled to the corresponding contacts of the audio plug through the headset cable, including:
   a ground line;
   a microphone line;
   at least one audio line; and
   an antenna for receiving a television broadcasting signal, coupled through a capacitive element to one of the contacts coupled to the ground line, the microphone line, and the at least one audio line, and the one of the contacts to which the antenna for receiving the television broadcasting signal is coupled further serves as a radio frequency contact to provide the television broadcasting signal and an audio broadcasting signal, wherein the contacts not serving as the radio frequency contact are not coupled to the capacitive element.

2. The headset according to claim 1, wherein the antenna for receiving the television broadcasting signal comprises a conductor disposed within the headset cable, and the conductor surrounds at least portions of the ground line, the microphone line, and the at least one audio line.

3. The headset according to claim 2, wherein the antenna for receiving the television broadcasting signal has a length not less than a quarter wavelength at a frequency within a frequency band for television broadcasting.

4. The headset according to claim 3, wherein one of the microphone line and at least one audio line serves as an antenna for receiving the audio broadcasting signal, and the antenna for receiving the audio broadcasting signal is coupled to the radio frequency contact.

5. The headset according to claim 2, wherein the conductor further serves as an antenna for receiving the audio broadcasting signal, and the radio frequency contact is one of the corresponding contacts coupled to the microphone line and at least one audio line.

6. The headset according to claim 5, wherein the antenna for receiving the television broadcasting signal has a length not less than one wavelength at a frequency within a frequency band for television broadcasting.

7. The headset according to claim 5, further comprising a plurality of chokes, wherein the corresponding contacts coupled to the ground line, the microphone line, and the at least one audio line are coupled to the respective chokes.

8. The headset according to claim 7, wherein the at least one audio line includes a channel line and a return line for each of the at least one earphone and the return line is coupled to the one of the contacts coupled to the ground line through one of the chokes.

9. The headset according to claim 7, wherein the capacitive element is coupled between the conductor and the radio frequency contact.

10. The headset according to claim 9, wherein the chokes and the capacitive element are disposed within the audio plug.

11. The headset according to claim 1, wherein the antenna for receiving the television broadcasting signal comprises a conductor and a transmission line coupled to the conductor, and the transmission line is separate from the ground line, the microphone line, and the at least one audio line.

12. The headset according to claim 11, wherein the conductor is a meander antenna and the transmission line is for impedance matching with the conductor.

13. The headset according to claim 11, wherein the capacitive element is coupled between the transmission line and the radio frequency contact.

14. The headset according to claim 13, wherein one of the microphone line and at least one audio line serves as an antenna for receiving the audio broadcasting signal, and the antenna for receiving the audio broadcasting signal is coupled to the radio frequency contact.

* * * * *